United States Patent
Breen et al.

(10) Patent No.: US 6,864,666 B2
(45) Date of Patent: Mar. 8, 2005

(54) 4 AND 3 SERIES BATTERY STACK VOLTAGE POWER SOURCE SELECTOR

(75) Inventors: John J. Breen, Harker Heights, TX (US); Christian L. Critz, Georgetown, TX (US); Brent A. McDonald, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 10/603,137

(22) Filed: Jun. 24, 2003

(65) Prior Publication Data

US 2004/0263118 A1 Dec. 30, 2004

(51) Int. Cl.[7] .................. H01M 10/44; H01M 10/46
(52) U.S. Cl. ................................................ 320/135
(58) Field of Search ............................ 320/103, 116, 320/118, 135

(56) References Cited

U.S. PATENT DOCUMENTS

| | | |
|---|---|---|
| 5,504,907 A | 4/1996 | Stewart et al. |
| 5,519,261 A | 5/1996 | Stewart |
| 5,545,935 A | 8/1996 | Stewart |
| 5,576,609 A | 11/1996 | Brown et al. |
| 5,592,394 A | 1/1997 | Wiscombe |
| 5,818,200 A | 10/1998 | Cummings et al. |
| 6,194,867 B1 | 2/2001 | Cummings et al. |

*Primary Examiner*—Edward H. Tso
(74) *Attorney, Agent, or Firm*—Haynes and Boone, LLP

(57) ABSTRACT

A method and system for selectively discharging a dual battery system, which includes a primary smart battery and a secondary smart battery, the dual battery system being operable to provide electrical energy to an information handling system device. The secondary smart battery having a sufficient amount of the electrical energy is housed in a removable media of the device and is selectively discharged in response to a loss of an AC power source providing the electrical energy to the device. The primary smart battery having a sufficient amount of the electrical energy is then discharged in response to the discharging of the secondary smart battery to a threshold level. The primary smart battery continues to provide the electrical energy upon removal of the secondary smart battery from the removable media.

20 Claims, 3 Drawing Sheets

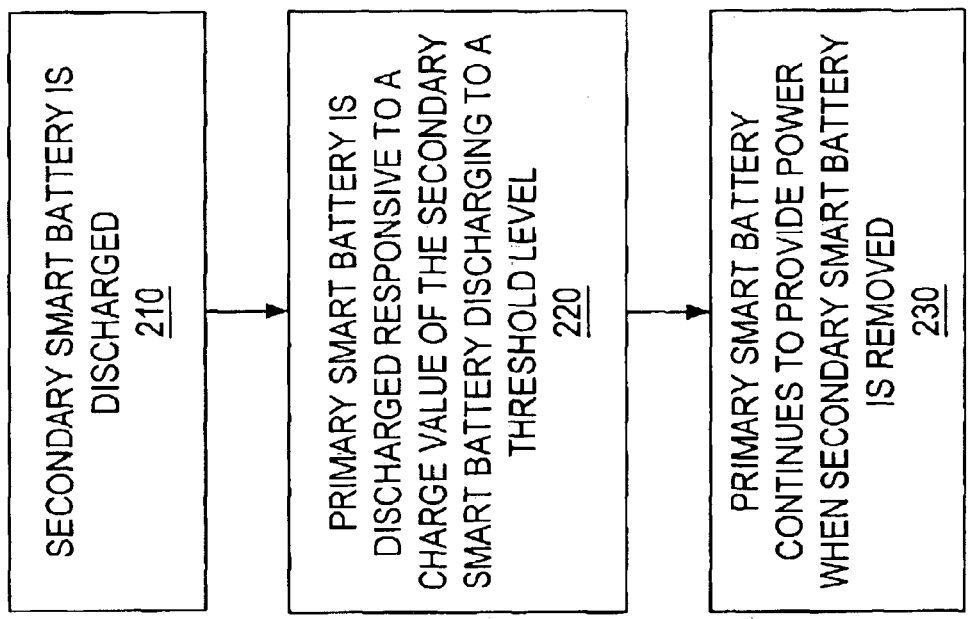

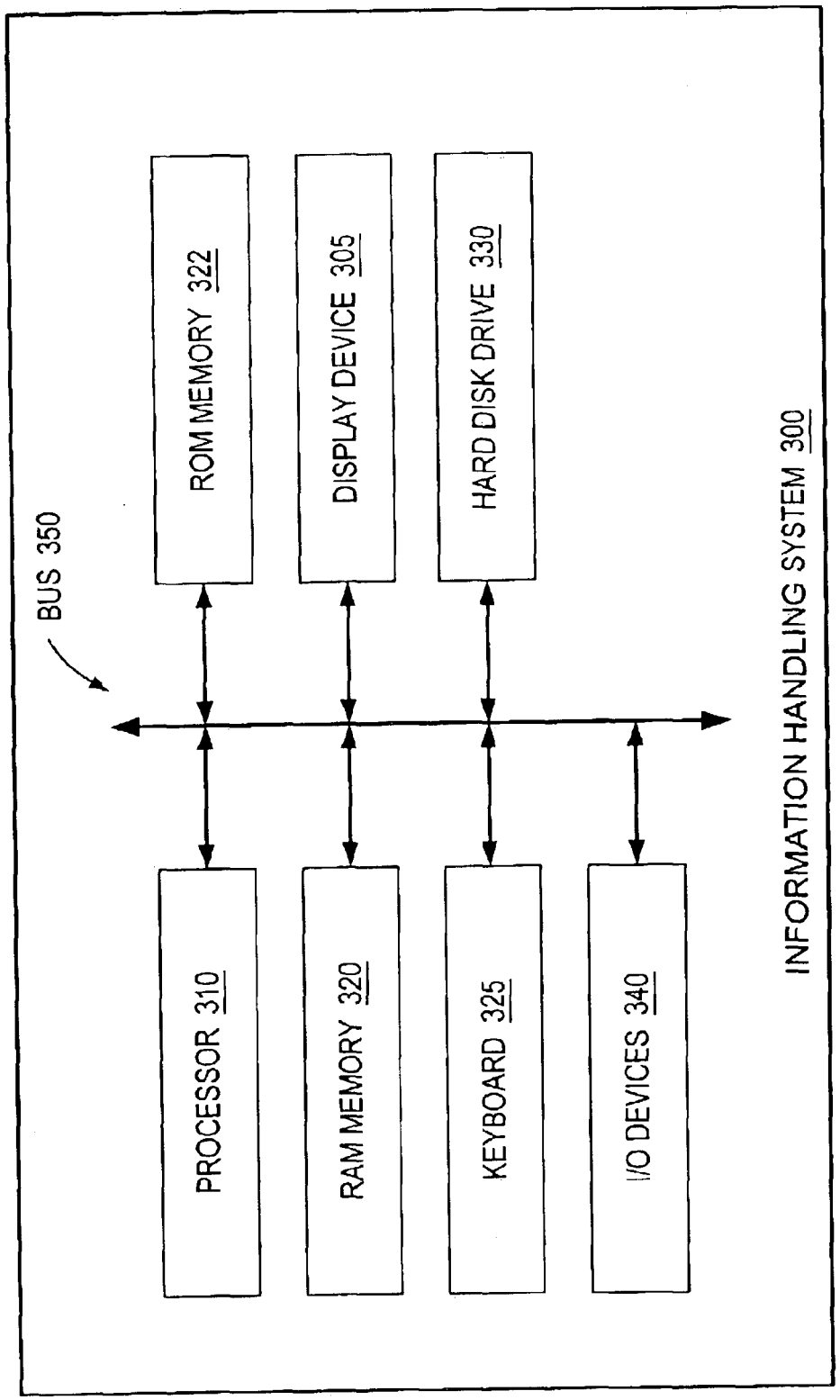

4 AND 3 SERIES BATTERY STACK VOLTAGE POWER SOURCE SELECTOR

CROSS-REFERENCE TO RELATED APPLICATION

This application is related to U.S. patent application Ser. No. 09/401,219, filed Sep. 22, 1999 and entitled "Power Supply Connector" by applicants John Cummings and John J. Breen. The entire content of this application is incorporated herein by this reference.

BACKGROUND

The present disclosure relates generally to information handling systems, and more particularly to techniques for providing power from battery and system power sources commonly used in portable information handling system devices such as notebook computers, personal digital assistants, cellular phones and gaming consoles.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A battery converts chemical energy within its material constituents into electrical energy in the process of discharging. A rechargeable battery is generally returned to its original charged state (or substantially close to it) by passing an electrical current in the opposite direction to that of the discharge. Presently well known rechargeable battery technologies include Lithium Ion (LiON), Nickel Cadmium (NiCd), and Nickel Metal Hydride (NiMH). In the past, the rechargeable batteries (also known as "dumb" batteries) provided an unpredictable source of power for the portable devices, since typically, a user of the device powered by the battery had no reliable advance warning that the energy supplied by the rechargeable battery was about to run out.

In absence of an AC power source, a battery 'pack' typically powers the portable information handling system device. The battery 'pack' typically includes a plurality of rechargeable battery cells arranged in a convenient, modular package. The battery pack is generally housed within the portable device in a detachable way. The plurality of battery cells are collectively referred to as a 'stack' and the voltage measured across the stack is referred to as a stack voltage.

Today, through the development of "smart" or "intelligent" battery packs, batteries have become a more reliable source of power by providing information to the information handling system and eventually to a user as to the state of charge, as well as a wealth of other information. The "smart rechargeable battery", which is well known, is typically equipped with electronic circuitry to monitor and control the operation of the battery.

It is desirable to maximize the amount of time a portable device may be used in a battery-operated mode. Various well-known power management tools and methods of extending the time of use of batteries exist. For example, one technique uses dual smart batteries in the portable devices as a means to extend the battery life. The following U.S. patents describe various aspects of using "dual" smart batteries and are incorporated herein by reference: Selection Circuit For Dual Batteries In A Battery Powered Electronic Device (U.S. Pat. No. 5,867,007), Dual Smart Battery Detection System And Method For Portable Computers (U.S. Pat. No. 5,818,200), and Increased Battery Capacity Utilizing Multiple Smart Batteries (U.S. Pat. No. 6,262,562), and Smart Battery Selector Offering Power Conversion Internally Within A Portable Device (U.S. Pat. No. 5,903,764).

In some dual smart battery systems, a removable media peripheral device such as a 3.5" floppy or an optical disk drive may be removed from a removable bay and replaced with a secondary or backup smart battery. The form factors of the primary and secondary primary batteries may vary. The secondary battery is capable of providing power to the portable device. In dual battery systems, problems may arise when the characteristics of two smart batteries used are different. For example, differences in number and types of cells and voltage per cell between two battery packs often result in a difference of output voltage level. Dell Computer Corporation (Round Rock, Tex., USA) provides 4 Series & 3 Series smart batteries for use in notebook computers. The 4SXP smart battery having a stack voltage of (12V–16.8V) and the 3SXP smart battery having a stack voltage of (9V–12.6V) are examples of a primary and secondary smart battery that may be used to power a device such as a Dell Lattitude™ D-Series dual battery notebook computer.

Typically when the stack voltages are dissimilar, the higher voltage pack will discharge first until it reaches approximately 0.4V above the other at which time the two battery packs will discharge in parallel via diodes. A problem arises when 4SXP smart battery having a stack voltage of (12V–16.8V) and the 3SXP smart battery having a stack voltage of (9V–12.6V) are selected as the primary and secondary smart batteries. In this case, the 'primary' smart battery will be selected for discharge first since it has the higher stack voltage. The primary smart battery continues to discharge to depletion. Upon depletion, the secondary smart battery having the lower stack voltage is switched on to continue to provide the power to the portable device. While operating in this mode, the user typically has limited visibility to the power available from the dual battery system. The visibility may be in the form of a battery icon displayed on a task bar of the device. The battery icon typically shows combined available power of the dual battery system and not the individual power for each of the smart batteries. The user is unaware that the primary smart battery has been critically discharged and the portable device is operating on the secondary smart battery. The user continues to observe the battery icon on a display of the portable device indicating that sufficient battery capacity is available to power the portable device even though the primary smart battery has been critically discharged. If the user elects to swap out the secondary smart battery with the removable media, the portable device experiences an immediate shutdown with possible loss of critical data.

Thus, the simultaneous presence of two or more batteries, especially smart batteries having different voltages, imposes certain difficulties in the operation of the dual battery system. Failure to deploy certain techniques may result in sudden loss of power and data, and hence in reduced reliability.

Therefore, a need exists to develop tools and techniques for providing more reliable power from battery and system power sources used in portable devices. More specifically, a need exists to develop tools and techniques for selectively discharging a dual battery system that is less expensive and more reliable than such systems and methods heretofore available. Accordingly, it would be desirable to provide tools and techniques for selectively discharging a dual battery system included in an information handling system absent the disadvantages found in the prior methods discussed above.

SUMMARY

The foregoing need is addressed by the teachings of the present disclosure, which relates to a system and method for selectively discharging a dual battery system operable to provide electrical energy to at least one information handling system device. According to one embodiment, a method and system for selectively discharging the dual battery system includes a primary smart battery and a secondary smart battery. The secondary smart battery having a sufficient amount of the electrical energy is housed in a removable media of the device and is selectively discharged in response to a removal of an AC power source providing the electrical energy to the device. The primary smart battery having a sufficient amount of the electrical energy is then discharged, in response to the discharging of the secondary smart battery to a threshold level. The primary smart battery continues to provide the electrical energy upon removal of the secondary smart battery from the removable media.

In one embodiment, a power supply system provides power to a portable information handling system device. The power supply system is connected to an AC adapter for deriving power from an AC power source. The power supply system includes a dual battery system having a primary smart battery and a secondary smart battery, a primary discharge switch operable to control discharging of the primary smart battery, a secondary discharge switch operable to control discharging of the secondary smart battery, a primary discharge enable switch operable to control the primary discharge switch from receiving the power from the primary smart battery, an AC power source switch operable to select the AC power source, and a battery charger operable to receive power from the AC adapter and provide the power to a selected one in the dual battery system. The secondary smart battery is housed in a removable media of the device. The secondary smart battery is selectable to be discharged prior to the primary smart battery in response to a loss of the AC power source. The primary smart battery continues to provide the electrical energy upon removal of the secondary smart battery from the removable media.

Several advantages are achieved by the method and system according to the illustrative embodiments presented herein. The embodiments advantageously provide for a reduced occurrence of loss of power and data, in addition to lower costs and improved reliability and efficiency while reducing the number of components.

BRIEF DESCRIPTION OF THE DRAWINGS

FIG. 2 is a flow chart illustrating a method for selectively discharging the dual battery system to provide electrical energy to the device operating in a battery powered mode, according to an embodiment.

FIG. 3 illustrates a block diagram of an information handling system to implement method or apparatus aspects of the present disclosure, according to an embodiment.

DETAILED DESCRIPTION

Figure 1:
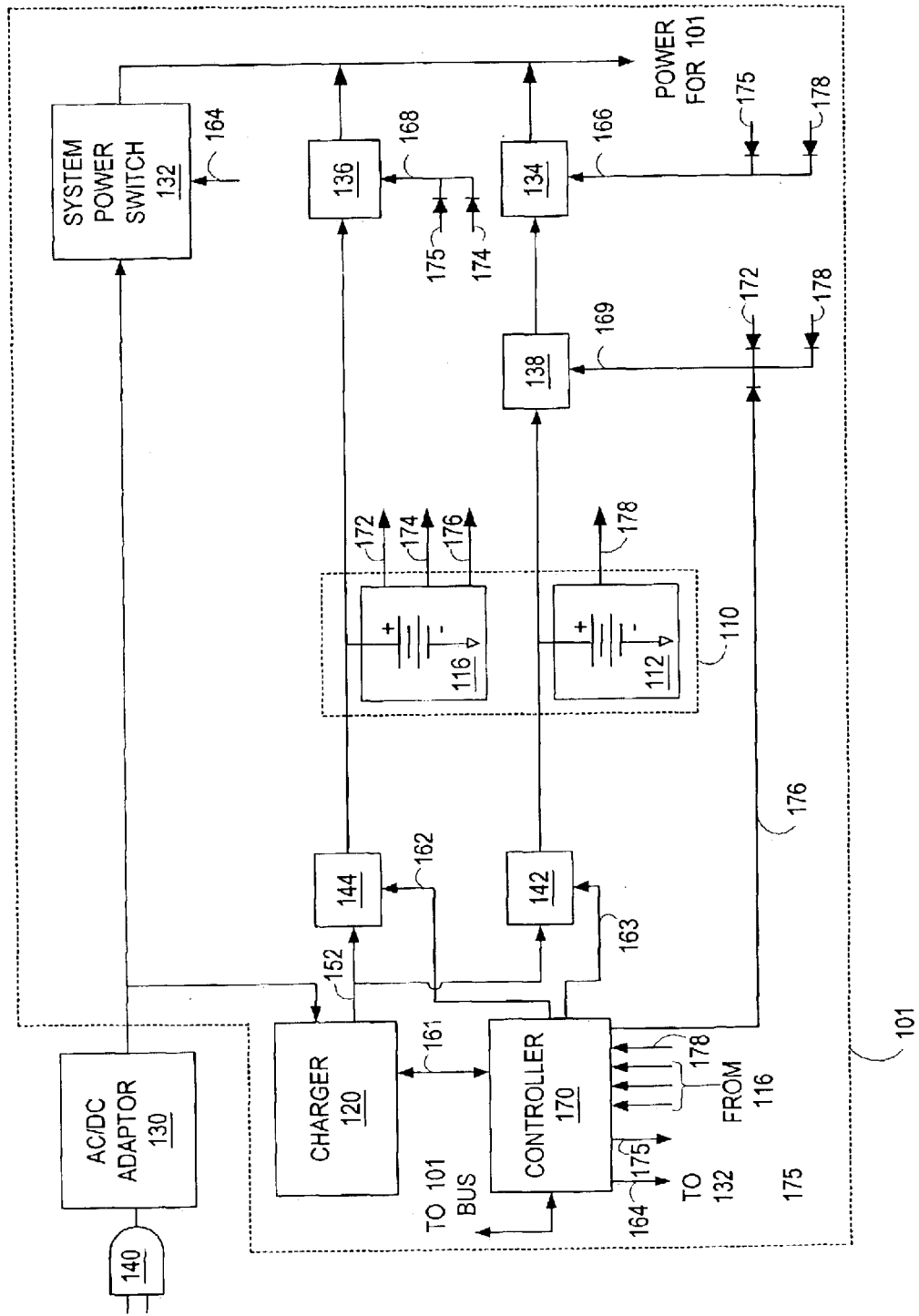
FIG. 1 illustrates a diagrammatic representation of a system for selecting battery and system power sources used to provide power to a portable device, according to an embodiment.

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various devices or components described herein may be implemented as hardware (including circuits) and/or software, depending on the application requirements.

The simultaneous presence of two or more smart batteries, especially dual battery systems having smart batteries rated at different voltages, to power a portable device imposes certain challenges on the operation and selection of the batteries in the dual battery system. Failure to deploy certain techniques may result in sudden loss of power and data, and hence in reduced reliability. A need exists to develop tools and techniques for selectively discharging a dual battery system. According to one embodiment, a method and system for selectively discharging the dual battery system includes a primary smart battery and a secondary smart battery. The secondary smart battery having a sufficient amount of the electrical energy is housed in a removable media of the device and is selectively discharged in response to a loss of an AC power source providing the electrical energy to the device. The primary smart battery having a sufficient amount of the electrical energy is then discharged, responsive to the discharging of the secondary smart battery to a threshold level. The primary smart battery continues to provide the electrical energy upon removal of the secondary smart battery from the removable media.

FIG. 1 illustrates a diagrammatic representation of a system for selecting battery and system power sources commonly used to provide power to portable information handling system devices such as notebook or laptop computers, according to an embodiment. The system for selecting battery and system power sources of the portable device 101 includes: 1) a dual battery system 110, which includes a primary smart battery 112 and a secondary smart battery 116, 2) a controller 170 included in the portable device 101 for controlling the selection and operation of the battery and AC power sources, 3) an AC power source 140, 4) an AC/DC adaptor device 130 for converting the AC voltage/power to DC voltage/power, 5) a charger device 120 providing the charge to each of the smart batteries 112 and 116 via a charge line 152, 6) an AC power source switch 132 for controlling the flow of power from the AC/DC adaptor 130 to the portable device 101 by control line 164, 7) a primary discharge switch 134 for controlling the flow of power from the primary smart battery 112 to the portable device 101 by control line 166, 8) a secondary discharge switch 136 for controlling the flow of power from the secondary smart battery 116 to the portable device 101 by control line 168, 9) a primary discharge enable switch 138 for controlling the primary discharge switch 134 from receiving the power from the primary smart battery 112, the primary discharge enable switch 138 being controlled by control line 169, 10) a primary charge switch 142 for controlling the flow of power from the charger 120 to the primary smart battery 112 by control line 162, and 11) a secondary charge switch 144 for controlling the flow of power from the charger 120 to the secondary smart battery 116 by control line 163.

In one embodiment, items 1–2, and 5–11 may be included in the device 101, while items 3 and 4 are external to the device 101. In one embodiment, a power supply system (not shown) includes items 1, and 5–11.

The controller 170 included in the portable device 101 is operable to control various inputs and outputs of the device 101. For example, the controller 170 may be used to control inputs and outputs of a keyboard (not shown) of the device 101 via a bus (not shown). In this embodiment, the controller 170 is used to receive inputs from various power sources and loads to control the flow of power from the various sources of power such as the dual battery system 110 and the AC power source 140 to the various loads of the power such as the portable device 101. The controller 170 controls the charger 120 by a control line 161. In one embodiment, a Basic Input Output System (BIOS) program (not shown) may be used to receive inputs and generate outputs.

In this embodiment, the device 101 includes a removable media peripheral device (not shown). As described earlier, the removable media peripheral device such as a 3.5" floppy or an optical disk drive housed in a removable bay may be removed and replaced with the secondary smart battery 116 for extended battery powered use of the device 101.

To advantageously extend the time and reduce loss of power and/or data during battery-powered use of the device 101, the secondary smart battery 116 is discharged first upon a loss, removal or non-availability of the AC power supply 140. The technique of preferentially discharging the secondary smart battery 116 first, prior to discharging the primary smart battery 112, enables the user to remove and/or replace the secondary smart battery 116 at any time during the battery powered use of the device 101 by substantially reducing occurrences of a loss of power and/or data upon removal of the secondary smart battery 116. This technique of consuming energy stored in the secondary smart battery 116 before consuming the energy stored in the primary smart battery 112 is advantageously used when the primary and secondary smart batteries 112 and 116 have different rated voltages. In one embodiment, the primary smart battery 112 is Dell's 4SXP smart battery having a stack voltage of (12V–16.8V) and the secondary smart battery 116 is Dell's 3SXP smart battery having a stack voltage of (9V–12.6V).

It is well known that smart batteries such as 112 and 116 are operable to control various operating conditions of the battery such as charging, discharging, ready to receive a charge, discharged, and ready to discharge, all of which affect the flow of power. In this embodiment, the intelligence of the controller 170 and the smarts in the batteries 112 and 116 are advantageously utilized to direct the flow of power.

Thus, the controller 170 operating in combination with the smart batteries 112 and 116, and other inputs described below control the flow of power from a source to a load. If AC power source 140 is available then the AC power switch 132 is closed and the primary and secondary discharge switches 134 and 136 are opened to deliver the power from the AC external source 140 to the portable device 101. While in this operating condition, one of the smart batteries 112 or 116 when present, may receive a charge from the charger 120 as directed by the controller 170 and the corresponding smart battery. While being charged, each of the smart batteries 112 and 116 may receive sufficient electrical energy or power to be stored for later use. In one embodiment, a sufficient amount of power is defined to be a charge level that is greater than 3% and up to and including 80% of relative state of charge (RSOC). A battery having a charge level of at least 80% of RSOC may be defined to be fully charged, while the battery having a charge level of less than 3% of RSOC may be described to be critically discharged.

If the external AC power source 140 is lost, removed or is otherwise not available then the AC power switch 132 is opened and the secondary discharge switch 136 is closed to selectively discharge the secondary smart battery 116 having the sufficient amount of the stored electrical energy to power the portable device 101. While in this operating condition, the operating condition of the secondary smart battery 116 is monitored by various sensors providing inputs such as secondary_battery_present 172, secondary_voltage 174, secondary_charge_level 176 and primary_voltage 178. Additional sensors/inputs such as battery temperature (not shown) may also be added to monitor the status of the primary and secondary smart batteries 112 and 116. In one embodiment, the controller 170 receives the monitoring inputs, described above, from the primary and secondary smart batteries 112 and 116. In one embodiment, if there is a change in inputs, such as: 1) removal of the smart battery 112 indicated by the secondary_battery_present 172, or 2) the secondary smart battery 116 being discharged to or below a threshold level indicated by the secondary_charge_level 176, or 3) the voltage level of the secondary smart battery 116 deviating from the rated voltage by a predefined amount or the voltage dropping below a predefined level, then the secondary discharge switch 136 is opened, the primary discharge enable switch 138 is closed, and the primary discharge switch 134 is closed. As a result, the secondary smart battery 116 ceases to discharge and the primary smart battery 112 provides the power to the device 101. The primary smart battery 112 continues to provide the power to the device 101 upon removal of the secondary smart battery 116. The predefined voltage level may be defined as a % of the rated voltage, e.g., 80% of the rated voltage. The threshold level for the secondary_charge_level 176 may be defined as a % of RSOC, e.g., 3% of RSOC.

The operation of the secondary discharge switch 136 is controlled by the control line 168. In one embodiment, the control line 168 includes the primary_voltage 178 input and a controller_output 175, which are combined into the control line 168 by a diode OR circuit. The secondary discharge switch 136 is responsive to an operating condition of the primary smart battery 112. That is, the switch 136 is opened or closed in response to the primary_voltage 178 input or the controller_output 175.

Similarly, the operation of the primary discharge switch 134 is controlled by the control line 166. In one embodiment, the control line 166 includes secondary_voltage 174 input and a controller_output 175, which are combined into the control line 166 by a diode OR circuit. The primary discharge switch 134 is responsive to an operating condition of the secondary smart battery 116. That is, the switch 134 is opened or closed in response to the secondary_voltage 174 input or the controller_output 175.

As described above, the operation of the primary discharge enable switch 138 is controlled by the control line 169. In one embodiment, the control line 169 includes secondary_battery_present 172 input, secondary_voltage 174 input, and secondary_charge_level 176 input, which are combined into the control line 169 by a diode OR circuit.

The primary discharge enable switch 138 is responsive to an operating condition of the secondary smart battery 116. That is, the switch 138 is opened or closed in response to any one of the three inputs described above.

In one embodiment, the battery charge line 152 and the control lines 161, 162, 163, 164, 166, 168 and 169 may be implemented using a well-known Systems Monitor Bus (SMBus) (not shown), which is widely used in the industry. In one embodiment, the battery charge line 152 and the control lines 161, 162, 163, 164, 166, 168 and 169 may be implemented using dedicated, electrically conducting lines or paths. Each line may be used to combine and transfer multiple inputs or outputs. As described above, control line 169 may include inputs secondary_battery_present 172, secondary_voltage 174, and secondary_charge_level 176, which are combined by a diode OR circuit.

In one embodiment, each of the switches 132, 134, 136, 138, 142 and 144 are implemented using MOSFET body diode devices (not shown). The MOSFET body diodes are advantageously used to minimize the impact of an accidental reverse connection of the battery 112 or 116 or other over-current causing conditions.

FIG. 2 is a flow chart illustrating a method for selectively discharging the dual battery system 110 to provide electrical energy to the device 101 operating in a battery powered mode. In this embodiment, the dual battery system 110 includes the primary smart battery 112 and the secondary smart battery 116, which is housed in the removable media portion of the device 101. In step 210, the secondary smart battery 116, which has a sufficient amount of the electrical energy, is discharged. In one embodiment, the secondary smart battery 116 is discharged in response to a loss of the AC power source 140. In step 220, the primary smart battery 112, which has a sufficient amount of the electrical energy, is discharged in response to the discharging of the secondary smart battery 116 to a threshold level. In step 230, the primary smart battery 112 continues to discharge, i.e., provide the electrical energy to the device 101, upon removal of the secondary smart battery 116.

Various steps described above may be added, omitted, combined, altered, or performed in different orders. For example, in one embodiment step 230 may be combined with step 210. That is, the secondary smart battery 116 may be automatically ejected when the charge level of the secondary smart battery 116 reaches the threshold level.

FIG. 3 illustrates a block diagram of an information handling system to implement method or apparatus aspects of the present disclosure, according to an embodiment. For purposes of this disclosure, an information handling system 300 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the information handling system 300 may be a personal computer, a network storage device, or any other suitable device and may vary in size, shape, performance, functionality, and price.

The information handling system 300 may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring to FIG. 3, the information handling system 300 includes a processor 310, a system random access memory (RAM) 320, a system ROM 322, a display device 305, a keyboard 325 and various other input/output devices 340. It should be understood that the term "information handling system" is intended to encompass any device having a processor that executes instructions from a memory medium. The information handling system 300 is shown to include a hard disk drive 330 connected to the processor 310 although some embodiments may not include the hard disk drive 330. The processor 310 communicates with the system components via a bus 350, which includes data, address and control lines. A communications device (not shown) may also be connected to the bus 350 to enable information exchange between the system 300 and other devices.

In one embodiment, the information handling system 300 may be used to implement the portable information handling system device 101 described in FIG. 1. The dual battery system 110 (not shown) may be configured to provide power to the information handling system 300. The input/output devices 340 may include the controller 170 (not shown).

The processor 310 is operable to execute the computing instructions and/or operations of the information handling system 300. The memory medium, e.g., RAM 320, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC). For example, in one embodiment, the BIOS program described may be implemented using an assembler language code.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. In an information handling system, a method for selectively discharging a dual battery system operable to provide electrical energy to an information handling system device, the method comprising:

discharging a secondary smart battery included in the dual battery system, wherein the secondary smart battery having a sufficient amount of the electrical energy is housed in a removable media of the device; and discharging a primary smart battery included in the dual battery system in response to the discharging of the secondary smart battery to a threshold level, wherein the primary smart battery has a sufficient amount of the electrical energy.

2. The method of claim 1, wherein the primary smart battery continues to provide the electrical energy upon removal of the secondary smart battery.

3. The method of claim 1, wherein the primary smart battery is different than the secondary smart battery, the primary smart battery having a higher voltage rating compared to the secondary smart battery.

4. The method of claim 1, wherein the discharging of the secondary smart battery is in response to a loss of AC power source providing the electrical energy to the device.

5. The method of claim 1, wherein the discharging of the secondary smart battery is selected to occur prior to the discharging of the primary smart battery.

6. The method of claim 1, wherein the threshold level is defined to be approximately equal to 3% of relative state of charge (RSOC).

7. The method of claim 1, wherein the sufficient amount is greater than 3% of relative state of charge (RSOC).

8. The method of claim 1, wherein the sufficient amount is approximately equal to 80% of relative state of charge (RSOC).

9. The method of claim 1, wherein the discharging of the primary and secondary smart batteries is selectively controlled by a controller, wherein the controller controls the discharging by controlling an operation of a discharge_primary switch and a discharge_secondary switch.

10. The method of claim 9, wherein the controller switches the discharging from the secondary smart battery to the primary smart battery in response to a removal of the secondary smart battery.

11. The method of claim 9, wherein the controller switches the discharging from the secondary smart battery to the primary smart battery in response to a disablement in the discharging of the secondary smart battery.

12. A power supply system for providing power to an information handling system device, the power supply system being connectable to an AC adapter for deriving power from an AC power source, the power supply system comprising:
a dual battery system including a primary smart battery and a secondary smart battery, wherein the secondary smart battery is selectable to be discharged prior to the primary smart battery in response to a loss of the AC power source, the secondary smart battery being housed in a removable media of the device;
a primary discharge switch operable to receive power from the primary smart battery, and being operable to control discharging of the primary smart battery;
a secondary discharge switch operable to receive power from the secondary smart battery, and being operable to control discharging of the secondary smart battery;
a primary discharge enable switch operable to control the primary discharge switch from receiving the power from the primary smart battery, the primary discharge enable switch being responsive to an operating condition of the secondary smart battery;
an AC power source switch operable to select the AC power source to provide the power to the device in response to an availability of the AC power source; and
a battery charger operable to receive power from the AC adapter and provide the power to a selected one in the dual battery system.

13. The power supply system of claim 12, wherein the primary smart battery continues to provide the power upon removal of the secondary smart battery.

14. The power supply system of claim 12, wherein a controller included in the devices controls the primary discharge switch, the secondary discharge switch and the primary discharge enable switch in response to the loss of the AC power source.

15. The power supply system of claim 14, wherein the controller closes the secondary discharge switch, opens the primary discharge switch and opens the primary discharge enable switch in response to the loss of the AC power source.

16. The power supply system of claim 14, wherein the controller opens the secondary discharge switch, closes the primary discharge switch and closes the primary discharge enable switch in response to a removal of the secondary smart battery or a depletion of power provided by the secondary smart battery to a predefined power level or a voltage of the secondary smart battery dropping below a predefined voltage level.

17. An information handling system comprising:
a processor;
a system bus;
a memory coupled to the processor through the system bus;
a removable media coupled to the processor and memory through the bus, the removable media operable to process input and outputs;
a power supply system operable to provide power to the processor, the bus, the removable media and the memory, the power supply system being connectable to an AC adapter for deriving power from an AC power source;
a controller coupled to the processor and memory through the system bus, the controller operable to control the power supply system; and
wherein the power supply system includes:
a dual battery system including a primary smart battery and a secondary smart battery, wherein the secondary smart battery is selectable to be discharged prior to the primary smart battery in response to a loss of the AC power source, the secondary smart battery being housed in the removable media;
a primary discharge switch operable to receive power from the primary smart battery, and being operable to control discharging of the primary smart battery;
a secondary discharge switch operable to receive power from the secondary smart battery, and being operable to control discharging of the secondary smart battery;
a primary discharge enable switch operable to control the primary discharge switch from receiving the power from the primary smart battery, the primary discharge enable switch being responsive to an operating condition of the secondary smart battery; and
a battery charger operable to receive power from the AC adapter and provide the power to a selected one in the dual battery system.

18. The system of claim 17, wherein the primary smart battery continues to provide the power upon removal of the secondary smart battery.

19. The system of claim 17, wherein the controller controls the primary discharge switch, the secondary discharge switch and the primary discharge enable switch in response to the loss of the AC power source.

20. The system of claim 17, wherein the controller opens the secondary discharge switch, closes the primary discharge switch and closes the primary discharge enable switch in response to a removal of the secondary smart battery or a depletion of power provided by the secondary smart battery to a predefined power level or a voltage of the secondary smart battery dropping below a predefined voltage level.

* * * * *